(12) United States Patent
Lee et al.

(10) Patent No.: US 9,866,744 B2
(45) Date of Patent: Jan. 9, 2018

(54) APPARATUS AND METHOD FOR CONTROLLING NETWORK CAMERA

(71) Applicant: Hanwha Techwin Co., Ltd., Changwon-si (KR)

(72) Inventors: Hwalsuk Lee, Changwon-si (KR); Jaeho Jang, Changwon-si (KR)

(73) Assignee: Hanwha Techwin Co., ltd., Changwon-si (KR)

(*) Notice: Subject to any disclaimer, the term of this patent is extended or adjusted under 35 U.S.C. 154(b) by 7 days.

(21) Appl. No.: 14/957,739

(22) Filed: Dec. 3, 2015

(65) Prior Publication Data
US 2017/0163868 A1 Jun. 8, 2017

(30) Foreign Application Priority Data

Jul. 23, 2015 (KR) .................. 10-2015-0104362

(51) Int. Cl.
*H04N 5/232* (2006.01)
*G06T 7/20* (2017.01)
*G06K 9/00* (2006.01)
*G06K 9/46* (2006.01)

(52) U.S. Cl.
CPC ..... *H04N 5/23206* (2013.01); *G06K 9/00771* (2013.01); *G06K 9/4604* (2013.01); *G06T 7/20* (2013.01); *G06T 2207/30241* (2013.01)

(58) Field of Classification Search
None
See application file for complete search history.

(56) References Cited

U.S. PATENT DOCUMENTS

| | | | | |
|---|---|---|---|---|
| 5,969,755 A * | 10/1999 | Courtney | ............ | G06F 17/3079 348/135 |
| 7,136,507 B2 * | 11/2006 | Han | ................. | G06K 9/00335 340/541 |
| 2004/0130620 A1 * | 7/2004 | Buehler | ............. | G06K 9/00335 348/143 |
| 2009/0219391 A1 * | 9/2009 | McLeish | ................. | G06T 7/277 348/143 |
| 2009/0268033 A1 * | 10/2009 | Ukita | ...................... | G06T 7/292 348/169 |

(Continued)

FOREIGN PATENT DOCUMENTS

| KR | 10-0744668 B1 | 8/2007 |
|---|---|---|
| KR | 10-0968024 B1 | 7/2010 |
| KR | 10-1048441 B1 | 7/2011 |

(Continued)

*Primary Examiner* — Shahbaz Nazrul
(74) *Attorney, Agent, or Firm* — Sughrue Mion, PLLC

(57) ABSTRACT

An apparatus for controlling a network camera includes: a receiver configured to receive at least one image captured by the network camera monitoring a predetermined region; and at least one processor configured to implement: a detector which detects a plurality of trajectories in accordance with movement of each of a plurality of objects in the image; and a controller which extracts object feature information from each of the plurality of trajectories, and, if object feature information extracted from a trajectory corresponds to first and second objects, separate the trajectory into a first trajectory comprising first object feature information and a second trajectory comprising second object feature information.

20 Claims, 6 Drawing Sheets

(56) References Cited

U.S. PATENT DOCUMENTS

2012/0249831 A1* 10/2012 Porter ................ H04N 5/23206
348/231.3
2012/0254369 A1* 10/2012 Gillard ................ H04N 13/004
709/219

FOREIGN PATENT DOCUMENTS

KR          10-1380628  B1    4/2014
WO          02-029722   A3    4/2002

* cited by examiner

APPARATUS AND METHOD FOR CONTROLLING NETWORK CAMERA

CROSS-REFERENCE TO THE RELATED APPLICATION

This application claims priority from Korean Patent Application No. 10-2015-0104362, filed on Jul. 23, 2015, in the Korean Intellectual Property Office, the disclosure of which is incorporated herein in its entirety by reference.

BACKGROUND

1. Field

Apparatuses and methods consistent with exemplary embodiments relate to controlling a network camera.

2. Description of the Related Art

A monitoring system that employs a network camera is configured such that the network camera transmits an image to a control apparatus, and the control apparatus receives the image and controls the network camera in response to the received image. The control apparatus may communicate with the network camera over a network.

The monitoring system may operate the network camera and an access point using the same Internet protocol for communication over the network.

SUMMARY

The exemplary embodiments provide an apparatus and a method for controlling a network camera to more accurately track a moving object.

Various aspects of the exemplary embodiments will be set forth in part in the description which follows and, in part, will be apparent from the description, or may be learned by practice of the presented embodiments.

According to an aspect of an exemplary embodiment, there is provided an apparatus for controlling a network camera which may include: a receiver configured to receive at least one image captured by the network camera monitoring a predetermined region; and at least one processor configured to implement: a detector which detects a plurality of trajectories in accordance with movement of each of a plurality of objects in the image; and a controller which extracts object feature information from each of the plurality of trajectories, and, if object feature information extracted from a trajectory corresponds to first and second objects, separate the trajectory into a first trajectory including first object feature information and a second trajectory including second object feature information.

Each of the plurality of trajectories may include an object identifier for identifying each of the plurality of objects; object image information regarding at least a portion of the image where each of the plurality of objects is displayed; and object moving line information extracted based on the object image information.

Each of the plurality of trajectories may be identified by the object identifier.

The controller may assign different object identifiers from an object identifier of the trajectory from which the object feature information is extracted to the first trajectory and the second trajectory, respectively.

The controller may assign a same object identifier as an object identifier of the trajectory from which the object feature information is extracted to the first trajectory, and assigns a different object identifier from the object identifier of the trajectory from which the object feature information is extracted to the second trajectory.

When the object feature information corresponds to the first object and the second object, two clusters of the first object and the second object correspond to the object feature information.

The object feature information may be appearance information of an object extracted from the object image information.

The object moving line information may be at least one of coordinate data and size data of an image of a plurality of object image frames constituting the object image information.

The controller may be further configured to compare a plurality of pieces of object feature information extracted from the plurality of trajectories, and if third object feature information and fourth object feature information among the plurality of pieces of object feature information are the same, to unites a third trajectory comprising the third object feature information with a fourth trajectory comprising the fourth object feature information.

The controller may assign a different object identifier from an existing object identifier of the third trajectory and an existing object identifier of the fourth trajectory to a trajectory united the third trajectory with the fourth trajectory.

The controller may assign the same object identifier as an existing object identifier of the third trajectory or an existing object identifier of the fourth trajectory to a trajectory united the third trajectory with the fourth trajectory.

The detector may detect another trajectory comprising the first object feature information from at least one image captured by another network camera connected to the network camera and monitoring another predetermined region, and the controller may assign an object identifier which is the same as an object identifier assigned to the first trajectory to the other trajectory.

According to an aspect of an exemplary embodiments, there is provided a method of controlling a network camera which may include: detecting a plurality of trajectories in accordance with movement of each of a plurality of objects from at least one image captured by the network camera monitoring a predetermined region; extracting object feature information from each of the plurality of trajectories; determining a number of trajectories corresponding to the object feature information; if object feature information extracted from a trajectory corresponds to first and second objects, separating the trajectory into a first trajectory comprising first object feature information and a second trajectory comprising second object feature information.

Each of the plurality of trajectories may include: an object identifier for identifying each of the plurality of objects; object image information regarding at least a portion of the image where each of the plurality of objects is displayed; and object moving line information extracted based on the object image information.

The first trajectory and the second trajectory may be identified by different object identifiers from an object identifier of the trajectory from which the object feature information is extracted.

The object feature information may be appearance information of an object extracted from the object image information.

The object moving line information may be at least one of coordinate data and size data of an image of a plurality of object image frames constituting the object image information.

The method may further include: comparing a plurality of pieces of object feature information extracted from the plurality of trajectories; and if third object feature information and fourth object feature information among the plurality of pieces of object feature information are the same, uniting a third trajectory including the third object feature information with a fourth trajectory including the fourth object feature information.

A trajectory generated by uniting the third trajectory with the fourth trajectory may be identified by a different object identifier from an existing object identifier of the third trajectory and an existing object identifier of the fourth trajectory.

The method may further include: receiving detecting another trajectory comprising the first object feature information from at least one image captured by another network camera connected to the network camera and monitoring another predetermined region; and assigning an object identifier which is the same as an object identifier assigned to the first trajectory to the other trajectory.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
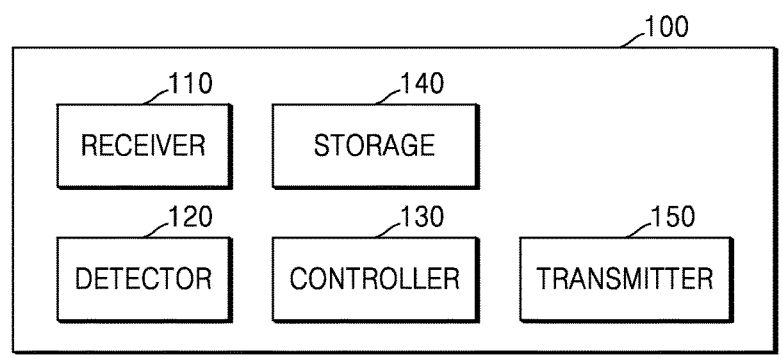
FIG. 1 is a block diagram of an apparatus for controlling a network camera, according to an exemplary embodiment.

Reference will now be made in detail to exemplary embodiments of the inventive concept, which are illustrated in the accompanying drawings. In this regard, the inventive concept may have different forms and should not be construed as being limited to the descriptions set forth herein. Accordingly, the exemplary embodiments are merely described below, by referring to the drawings, to explain various aspects of the inventive concept. Moreover, detailed descriptions related to well-known functions or configurations may be omitted in order not to unnecessarily obscure subject matters of the exemplary embodiments.

In the drawings, like reference numerals denote like elements, and overlapping descriptions thereof will be omitted.

FIG. 1 is a block diagram of an apparatus 100 for controlling a network camera, according to an exemplary embodiment.

Referring to FIG. 1, the apparatus 100 for controlling the network camera according to an exemplary embodiment may include a receiver 110, a detector 120, a controller 130, a storage 140, and a transmitter 150.

The receiver 110 may receive an image that captures a predetermined region. The predetermined region may be a region monitored by a single camera or a plurality of cameras. The receiver 110 may receive an image captured by the single camera or a plurality of images captured by the plurality of cameras. Here, the receiver 110 may be implemented by an input/output (I/O) interface through which the image is input and a result of processing at the apparatus 100 is output, as well known in the art.

The detector 120 may detect a plurality of trajectories from the image in accordance with movement of each of the plurality of objects. Each of the plurality of trajectories may include or represented by an object identifier, object image information, and object moving line information.

The object identifier may be information for identifying the plurality of objects. The detector 120 may assign a single object identifier to a single trajectory, and thus the single trajectory may correspond to the single object. That is, the plurality of trajectories may be identified by respective object identifiers.

The object image information may be information regarding a portion of an image that indicates an object, and may be configured as a plurality of object image frames.

The object moving line information may be information regarding a moving path of the object. For example, the object moving line information may be extracted based on the object image information. In this regard, the object moving line information may be or represented by at least one of coordinate data and size data of each of the plurality of object image frames in the image. The coordinate data may be an x coordinate value and a y coordinate value at a same point of each of the plurality of object image frames but is not limited thereto. The size data may be, for example, a width value and a height value of each of the plurality of rectangular object image frames but is not limited thereto.

The controller 130 may extract object feature information from each of the plurality of trajectories.

The object feature information may be information regarding actual objects, for example, appearance information of an object extracted from the object image information. The appearance information of the object may include at least one of face recognition information of the object, body type recognition information, motion recognition information, and clothing recognition information but is not limited thereto.

The controller 130 may determine the number of objects corresponding to object feature information extracted from one trajectory. According to an exemplary embodiment, the controller 130 may determine the number of objects corresponding to the object feature information extracted from one trajectory by applying a clustering method. For example, when two or more object clusters correspond to the object feature information extracted from one trajectory, the controller 130 may determine that this object feature information corresponds to two or more objects. In the present embodiment, a cluster may mean a group of same pieces of object feature information, for example, a group of pieces of face recognition information recognized as belonging to the same object.

When the object feature information extracted from one trajectory corresponds to n objects, the controller 130 may separate this trajectory from which the object feature information is extracted into n trajectories.

According to an exemplary embodiment, the controller 130 may separate a first mother trajectory from which the object feature information corresponding to first and second objects into a first son trajectory including first object feature information corresponding to the first object and a second son trajectory including second object feature information corresponding to the second object.

In this regard, the controller 130 may assign a first object identifier to the first son trajectory and a second object identifier different from the first object identifier to the second son trajectory, thereby identifying the first son trajectory and the second son trajectory. For example, the controller 130 may assign object identifiers different from that of the first mother trajectory to the first and second son trajectories. As another example, the controller 130 may assign same identifier as that of the first mother trajectory to the first son trajectory and a different identifier from that of the first mother trajectory to the second son trajectory.

The controller 130 may compare a plurality of pieces of object feature information of a plurality of trajectories. According to an exemplary embodiment, the controller 130 may compare the plurality of pieces of object feature information of the plurality of trajectories including the first and second son trajectories.

When m pieces of object feature information extracted from m number of trajectories correspond to a single object, the controller 130 may unite the m number of trajectories into a single trajectory.

According to an exemplary embodiment, when third and fourth object feature information are the same among the plurality of pieces of object feature information, the controller 130 may unit a third mother trajectory including the third object feature information and a fourth mother trajectory including the fourth object feature information as a single second son trajectory.

In this regard, for example, the controller 130 may assign a fifth object identifier that is different from a third object identifier of the third mother trajectory and a fourth object identifier of the fourth mother trajectory, to the second son trajectory. For another example, the controller 130 may assign the third object identifier or the fourth object identifier to the second son trajectory.

The storage 140 may store information regarding the plurality of trajectories including trajectories separated or united by the controller 130.

The transmitting unit 150 may transmit the information stored in the storage 140 to the outside.

The apparatus 100 for controlling the network camera according to an exemplary embodiment may be connected to a plurality of network cameras over a network such as a wired communication network or a wireless communication network. That is, the apparatus 100 for controlling the network camera according to an exemplary embodiment may be connected to the network cameras over the network while being identified by the network cameras. Thus, the apparatus 100 is separated from the network cameras.

The apparatus 100 for controlling the network camera according to an exemplary embodiment may be included in a network camera. The apparatus 100 for controlling the network camera according to an exemplary embodiment may be included in a single network camera to receive only an image captured by the single network camera and even an image captured by another network camera connected to the single network camera over a network.

Although the apparatus 100 for controlling the network camera according to another exemplary embodiment is illustrated as being a single device in FIG. 1, the apparatus 100 may not be necessarily implemented as a single physical device. For example, the apparatus 100 for controlling the network camera may be implemented by coupling a plurality of physical devices. As another example, a part of the apparatus 100 for controlling the network camera may be implemented to be included in a network camera and another part thereof may be implemented as another physical device.

Figure 2:
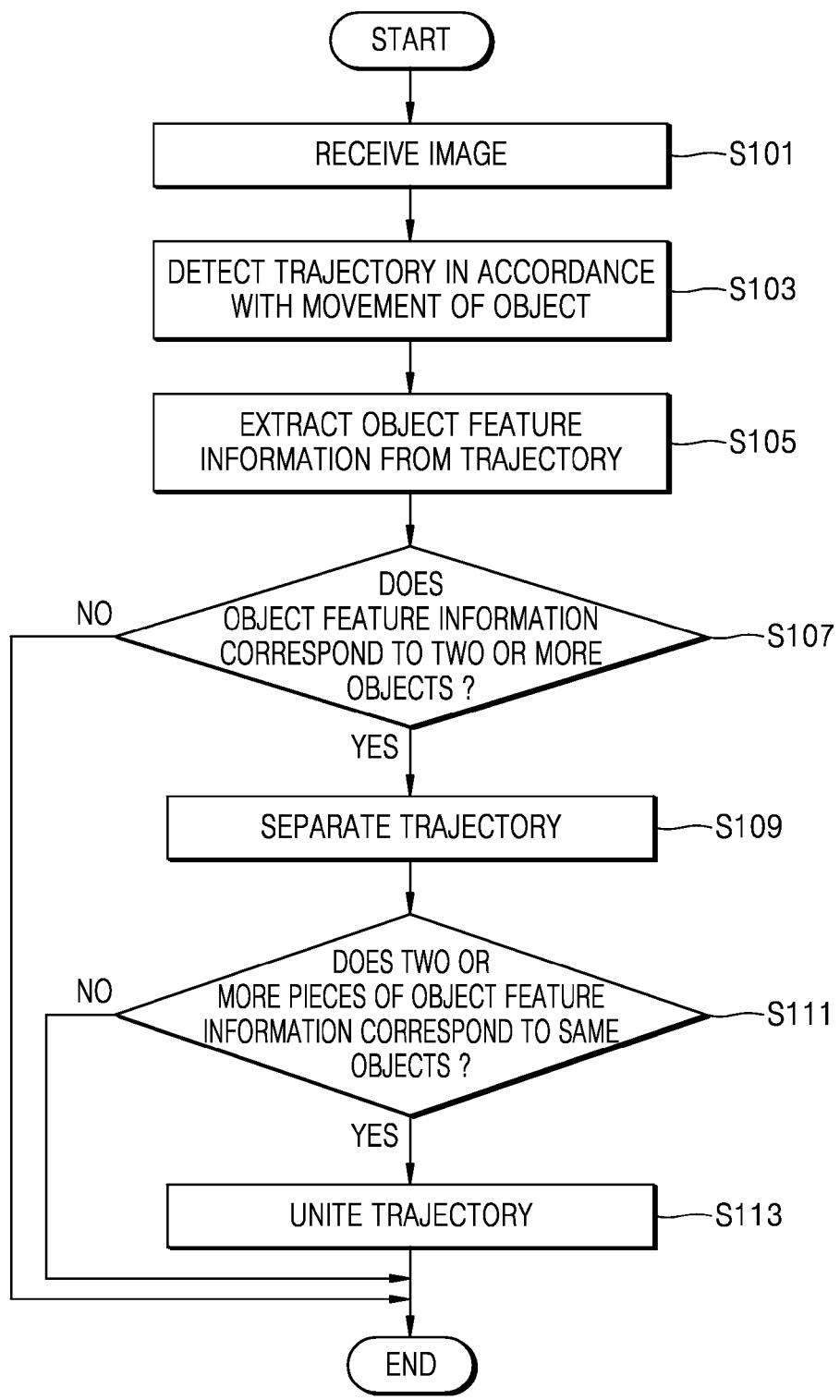
FIG. 2 is a flowchart of a method of controlling a network camera, according to an exemplary embodiment.
Figure 3:
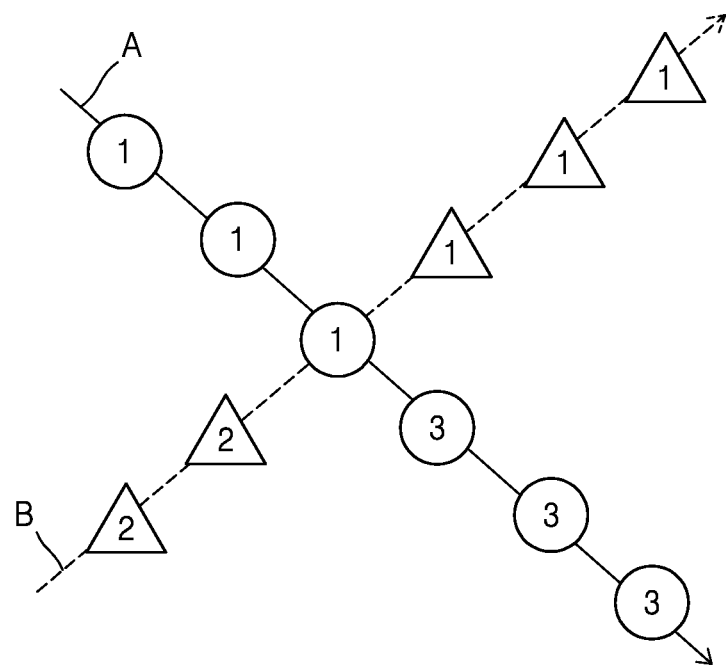
FIGS. 3 through 5 are diagrams for describing a method of controlling a network camera, according to exemplary embodiments.

FIG. 2 is a flowchart of a method of controlling a network camera, according to an exemplary embodiment. FIGS. 3 through 5 are diagrams for describing a method of controlling a network camera, according to exemplary embodiments.

Referring to FIG. 2, the receiver 110 of the apparatus 100 for controlling the network camera according to an exemplary embodiment may receive an image that captures a predetermined region (operation S101). The receiver 110 may receive an image captured by a single camera or a plurality of images captured by a plurality of cameras.

Thereafter, the detector 120 may detect a trajectory from the image in accordance with movement of an object (operation S103). When an image that captures a plurality of objects is received through the receiver 110, the detector 120 may detect a plurality of trajectories in accordance with movement of each of the plurality of objects.

The receiver 110 may receive images that capture a first object A and a second object B. The first object A and the second object B may overlap each other while moving.

Figure 4A:
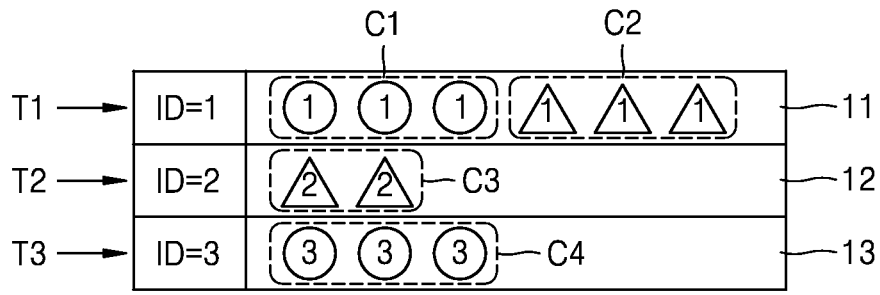
Figure 5:
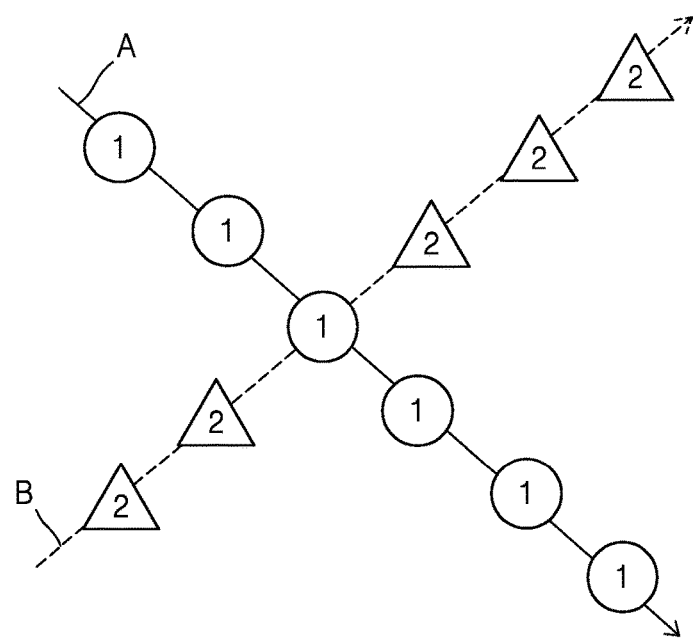

Referring to FIGS. 3 and 4A, the detector 120 may detect a trajectory in accordance with movement of each of the first object A and the second object B from the image. Here, the image may be a moving image according to an exemplary embodiment. However, when the plurality of objects may overlap while moving as shown in FIG. 3, an object identifier assigned to each of the plurality of objects may be changed.

For example, the detector 120 may assign a first object identifier ID=1 to a trajectory before the first object A overlaps the second object B and a second object identifier ID=2 to a trajectory before the second object B overlaps the first object A. When the first object A and the second object B overlap each other while moving, the first object identifier ID=1 assigned to the first object A may be changed to a third object identifier ID=3, and the second object identifier ID=2 assigned to the second object B may be changed to the first object identifier ID=1 thereafter.

As a result of overlapping of the first and second objects A and B while moving as described above, a first trajectory T1 may include the first object identifier ID=1 and first object image information 11, a second trajectory T2 may include the second object identifier ID=2 and second object image information 12, and a third trajectory T3 may include the third object identifier ID=3 and third object image information 13. Although not shown, the first through third trajectories T1 through T3 may respectively include first through third object moving line information.

Thereafter, in FIG. 2, the controller 130 may extract object feature information from each of the plurality of trajectories (operation S105). The controller 130 may extract the object feature information from each of the first object image information 11, the second object image information 12, and the third object image information 13. Hereinafter, a plurality of figures indicated in object image information regions of FIGS. 4A through 4C and 7 show the object feature information of each of a plurality of object image frames.

Thereafter, in FIG. 2, the controller 130 may determine whether object feature information extracted from one trajectory corresponds to two or more objects (operation S107). In FIG. 4A, a first cluster C1 and a fourth cluster C4 are a group of object feature information recognized as the first object A, and a second cluster C2 and a third cluster C4 are a group of object feature information recognized as the second object B. The first cluster C1 and the second cluster C2 may correspond to the first object image information 11, and thus, the controller 130 may determine that the first object image information 11 corresponds to the first object A and the second object B.

Figure 4B:
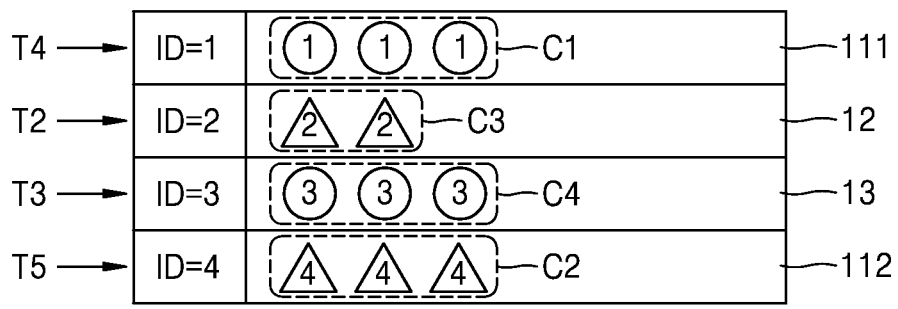

Thereafter, in FIG. 2, when the object feature information extracted from one trajectory corresponds to two or more objects, the controller 130 may separate this trajectory into as many trajectories as the number of objects (operation S109). Referring to FIG. 4B, the controller 130 may separate the first object image information 11 corresponding to the first cluster C1 and the second cluster C2 into a fourth trajectory T4 including the first cluster C2 and a fifth trajectory T5 including the second cluster C2. The fourth trajectory T4 may include fourth object image information 111. The fifth trajectory T5 may include fifth object image information 112.

In this regard, the controller 130 may assign the first object identifier ID=1 that is the same object identifier as the first trajectory T1 to the fourth trajectory T4 and a fourth object identifier ID=4 that is a different object identifier from the first trajectory T1 to the fifth trajectory T5.

Thereafter, in FIG. 2, the controller 130 may determine whether two or more pieces of object feature information correspond to the same object (operation S111). In FIG. 4B, the controller 130 may determine that the fourth object image information 111 and the third object image information 13 correspond to the first object A, and the second object image information 12 and the fifth object image information 112 correspond to the second object B.

Figure 4C:
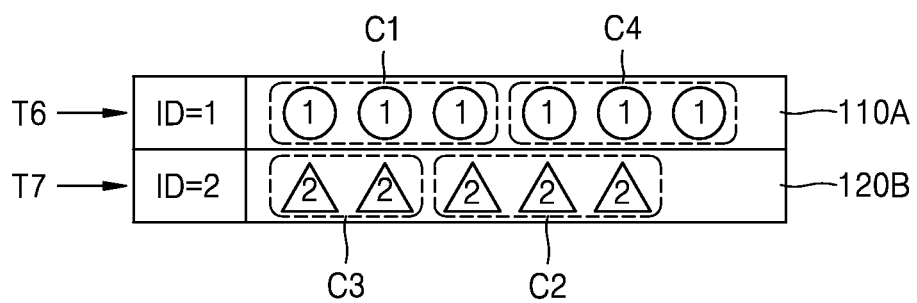

Thereafter, in FIG. 2, when the two or more pieces of object feature information extracted from two or more trajectories correspond to the same object, the controller 130 may unite the two or more trajectories (operation S113). Referring to FIG. 4C, the controller 130 may unite the fourth trajectory T4 including the first cluster C1 and the third trajectory T3 including the fourth cluster C4 as a sixth trajectory T5, and unite the second trajectory T2 including the third cluster C3 and the fifth trajectory T5 including the second cluster C2 as a seventh trajectory T7.

In this regard, the controller 130 may assign the first object identifier ID=1 that is the same object identifier as the first trajectory T1 to a sixth trajectory T6 and the second object identifier ID=2 that is the same object identifier as the second trajectory T2 to a seventh trajectory T7. In this regard, the sixth trajectory T6 may include sixth object image information 110A, and the seventh trajectory T7 may include seventh object image information 120B.

According to an exemplary embodiment, when a plurality of objects overlap while moving in an image captured by a single network camera, even though object identifiers that identify the plurality of objects are changed (see FIG. 3), a single object identifier may indicate a single object by separating and uniting a plurality of trajectories corresponding to the plurality of objects (see FIG. 5). Thus, according to an exemplary embodiment, a moving object may be more accurately tracked.

Figure 6:
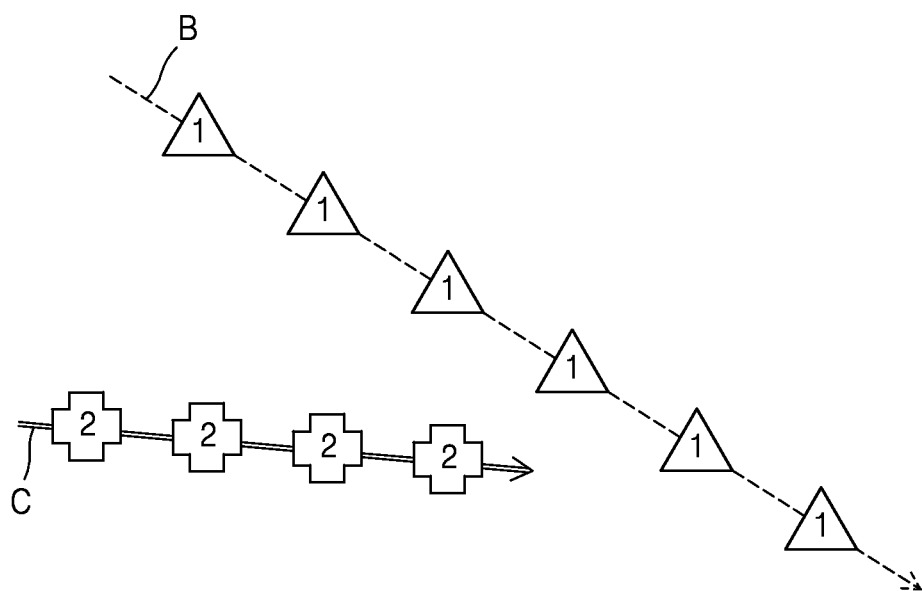
FIGS. 6 and 7 are diagrams for describing a method of controlling a network camera, according to another exemplary embodiment.
Figure 7:
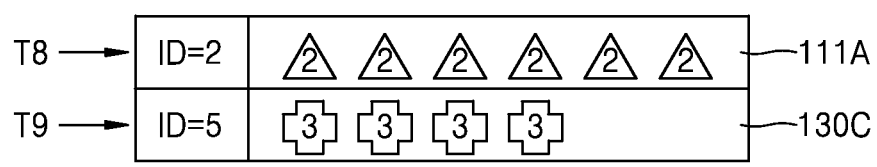

FIGS. 6 and 7 are diagrams for describing a method of controlling a network camera, according to another exemplary embodiment.

FIGS. 4C and 5 illustrate results obtained by tracking an object in an image captured by a first camera.

Hereinafter, FIGS. 6 and 7 are diagrams for describing a method of tracking an object from an image captured by a second camera different from the first camera.

Referring to FIG. 6, the receiver 110 may receive images that capture the second object B and a third object C. The second object B may be an object tracked from an image captured by a first camera according to an exemplary embodiment.

The detector 120 may detect a trajectory in accordance with movement of each of the second object B and the third object C from the images. The detector 120 may assign the same object identifier as an object identifier assigned to a trajectory detected from the image captured by the first camera to a trajectory detected from the image captured by the second camera.

Thereafter, the controller 130 may perform a trajectory separation operation S109 and a trajectory uniting operation S113 of FIG. 2 based on information regarding the image captured by the first camera and information regarding the image captured by the second camera as shown in FIG. 4C. As a result, the controller 130 may assign the second object identifier ID=2 that is the same object identifier as the seventh trajectory T7 to an eighth trajectory T8 and assign a fifth object identifier ID=5 that is a new object identifier to a ninth trajectory T9. In this regard, the eighth trajectory T8 may include eighth object image information 111A, and the ninth trajectory T9 may include ninth object image information 130C.

According to an exemplary embodiment, an object tracked in an image captured by one network camera may be tracked using the same object identifier in an image captured by another network camera, thereby more accurately tracking a moving object.

The operations and/or steps described in the above exemplary embodiments may be implemented as computer programs that may be executed in a computer by using various elements, and the computer programs may be recorded on a non-transitory computer-readable recording medium. Examples of the non-transitory computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Furthermore, examples of the non-transitory computer-readable recording medium include tangible media that may be transmitted through a network. For example, the non-transitory computer-readable recording medium may be implemented as software or an application and may be transmitted and distributed through a network.

The computer programs may be designed and constructed particularly for the inventive concept or may be known to and may be used by one of ordinary skill in a field of computer software. Examples of the computer programs include a high-level language code that may be executed by a computer using an interpreter as well as a machine language code made by a compiler.

At least one of the components, elements, modules or units represented by a block as illustrated in FIG. 1 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

According to the exemplary embodiments described above, an apparatus and a method for controlling a network camera that more accurately tracks a moving object may be provided.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While the above exemplary embodiments have been described with reference to the drawings, it will be understood by those of ordinary skill in the art that various changes in form and details may be made therein without departing from the spirit and scope of the inventive concept as defined by the following claims.

What is claimed is:

1. An apparatus for controlling a network camera, the apparatus comprising:
   a receiver configured to receive at least one image captured by the network camera monitoring a predetermined region; and
   at least one processor configured to implement:
      a detector which detects a plurality of trajectories in accordance with movement of each of a plurality of objects in the at least one image, the plurality of trajectories comprising a first trajectory and a second trajectory; and
      a controller which extracts first object feature information from the first trajectory, extracts second object feature information from the second trajectory, compares the first object feature information with the second object feature information, and, in response to the first object feature information and the second object feature information being same, unites the first trajectory with the second trajectory.

2. The apparatus of claim 1, wherein each trajectory of the plurality of trajectories comprises:
   an object identifier for identifying each object of the plurality of objects;
   object image information regarding at least a portion of an image where the each object of the plurality of objects is displayed; and
   object moving line information extracted based on the object image information.

3. The apparatus of claim 2, wherein the each trajectory of the plurality of trajectories is identified by the object identifier.

4. The apparatus of claim 2, wherein the first trajectory comprises a first object identifier and the second trajectory comprises a second object identifier, and wherein the controller assigns, to a third trajectory generated by uniting the first trajectory and the second trajectory, a third object identifier that is different from the first object identifier and the second object identifier.

5. The apparatus of claim 2, wherein the first trajectory comprises a first object identifier and the second trajectory comprises a second object identifier, and wherein the controller assigns the first object identifier to a third trajectory generated by uniting the first trajectory with the second trajectory.

6. The apparatus of claim 2, wherein a third trajectory, generated by uniting the first trajectory with the second trajectory, is associated with a third object feature information comprising a first cluster corresponding to a first object and a second cluster corresponding to a second object.

7. The apparatus of claim 2, wherein at least one of the first object feature information and the second object feature information is appearance information of an object extracted from the object image information.

8. The apparatus of claim 2, wherein the object moving line information is at least one of coordinate data and size data of the image of a plurality of object image frames constituting the object image information.

9. The apparatus of claim 1, wherein the controller generates a third trajectory by uniting the first trajectory with the second trajectory, and, in response to third object feature information of the third trajectory corresponding to a first object and a second object, separating the third trajectory into a fourth trajectory comprising fourth object feature information and a fifth trajectory comprising fifth object feature information.

10. The apparatus of claim 1, wherein the controller assigns an object identifier, different from a first object identifier of the first trajectory and a second object identifier of the second trajectory, to a third trajectory generated by uniting the first trajectory with the second trajectory.

11. The apparatus of claim 1, wherein the controller assigns an object identifier, which is same as one of a first object identifier of the first trajectory and a second object identifier of the second trajectory, to a third trajectory generated by uniting the first trajectory with the second trajectory.

12. The apparatus of claim 1, wherein the detector detects a third trajectory comprising the first object feature information from at least one image captured by another network camera connected to the network camera and monitoring another predetermined region, and
   wherein the controller assigns, to the third trajectory, a first object identifier which is same as a second object identifier assigned to the first trajectory.

13. A method of controlling a network camera using at least one processor, the method comprising:
   detecting a plurality of trajectories in accordance with movement of each of a plurality of objects from at least one image captured by the network camera monitoring a predetermined region, the plurality of trajectories comprising a first trajectory and a second trajectory;
   extracting first object feature information from the first trajectory and second object feature information from the second trajectory;

in response to the first object feature information and the second object feature information being same, uniting the first trajectory with the second trajectory.

14. The method of claim 13, wherein each trajectory of the plurality of trajectories comprises:
   an object identifier for identifying each object of the plurality of objects;
   object image information regarding at least a portion of an image where the each object of the plurality of objects is displayed; and
   object moving line information extracted based on the object image information.

15. The method of claim 14, wherein the first trajectory and the second trajectory are identified by object identifiers different from an object identifier of a third trajectory generated by uniting the first trajectory and the second trajectory.

16. The method of claim 14, wherein at least one of the first object feature information and the second object feature information is appearance information of an object extracted from the object image information.

17. The method of claim 14, wherein the object moving line information is at least one of coordinate data and size data of the image of a plurality of object image frames constituting the object image information.

18. The method of claim 13, wherein a third trajectory generated by uniting the first trajectory with the second trajectory is identified by an object identifier different from a first object identifier of the first trajectory and a second object identifier of the second trajectory.

19. The method of claim 13, further comprising:
   detecting a third trajectory comprising the first object feature information from at least one image captured by another network camera connected to the network camera and monitoring another predetermined region, and
   assigning, to the third trajectory, a first object identifier which is same as a second object identifier assigned to the first trajectory.

20. An apparatus for controlling a network camera, the apparatus comprising:
   a receiver configured to receive at least one image captured by the network camera monitoring a predetermined region; and
   at least one processor configured to implement:
      a detector which detects a plurality of trajectories in accordance with movement of each of a plurality of objects in the image; and
      a controller which extracts object feature information from each of the plurality of trajectories, and, in response to object feature information extracted from a trajectory corresponding to first and second objects, separate the trajectory into a first trajectory comprising first object feature information and a second trajectory comprising second object feature information,
   wherein the detector detects another trajectory comprising the first object feature information from at least one image captured by another network camera connected to the network camera and monitoring another predetermined region, and
   wherein the controller assigns, to the another trajectory, a first object identifier which is same as a second object identifier assigned to the first trajectory.

* * * * *